United States Patent
Hamada et al.

(10) Patent No.: US 11,333,189 B2
(45) Date of Patent: May 17, 2022

(54) BOLT

(71) Applicant: NISSAN MOTOR CO., LTD., Yokohama (JP)

(72) Inventors: Takahiro Hamada, Kanagawa (JP); Daisuke Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/965,643

(22) PCT Filed: Jan. 30, 2018

(86) PCT No.: PCT/JP2018/002983
§ 371 (c)(1),
(2) Date: Jul. 29, 2020

(87) PCT Pub. No.: WO2019/150434
PCT Pub. Date: Aug. 8, 2019

(65) Prior Publication Data
US 2021/0040978 A1 Feb. 11, 2021

(51) Int. Cl.
| | |
|---|---|
| *C21D 1/18* | (2006.01) |
| *F16B 35/00* | (2006.01) |
| *C21D 9/00* | (2006.01) |
| *C22C 38/00* | (2006.01) |
| *C22C 38/02* | (2006.01) |
| *C22C 38/04* | (2006.01) |
| *C22C 38/22* | (2006.01) |

(52) U.S. Cl.
CPC ............ *F16B 35/00* (2013.01); *C21D 9/0093* (2013.01); *C22C 38/002* (2013.01); *C22C 38/02* (2013.01); *C22C 38/04* (2013.01); *C22C 38/22* (2013.01); *C21D 2211/008* (2013.01)

(58) Field of Classification Search
CPC ... C21D 1/18; C21D 1/25; C21D 1/32; C21D 1/76; C21D 2211/008; C21D 8/005; C21D 9/0093; C22C 38/00; F16B 35/00
USPC ......................................................... 420/105
See application file for complete search history.

(56) References Cited

U.S. PATENT DOCUMENTS

| | | | |
|---|---|---|---|
| 10,913,993 B2 * | 2/2021 | Hamada | ............... C21D 9/0093 |
| 2012/0230800 A1 | 9/2012 | Kimura et al. | |
| 2012/0247618 A1 | 10/2012 | Hirakami et al. | |
| 2017/0283921 A1 | 10/2017 | Hamada et al. | |

FOREIGN PATENT DOCUMENTS

| | | |
|---|---|---|
| CN | 102876965 A | 1/2013 |
| CN | 103290327 A | 9/2013 |
| CN | 106795598 A | 5/2017 |
| EP | 3 187 610 A1 | 7/2017 |
| JP | 64-52045 A | 2/1989 |
| JP | 07-112236 A | 5/1995 |
| JP | 10-141341 A | 5/1998 |
| JP | 11-199922 A | 7/1999 |
| JP | 2006-131990 A | 5/2006 |
| JP | 2009-299180 A | 12/2009 |
| JP | 2012-233244 A | 11/2012 |
| JP | 2016-186098 A | 10/2016 |
| WO | WO 2016/031528 A1 | 3/2016 |

* cited by examiner

*Primary Examiner* — Jie Yang
(74) *Attorney, Agent, or Firm* — Foley & Lardner LLP

(57) ABSTRACT

A bolt of the present invention is a high-strength bolt of high-carbon steel having a tempered martensite structure, wherein the composition of the bolt comprises: 0.50 mass % or more and 0.65 mass % or less of carbon (C); 1.5 mass % or more and 2.5 mass % or less of silicon (Si); 1.0 mass % or more and 2.0 mass % or less of chromium (Cr); 0.2 mass % or more and 1.0 mass % or less of manganese (Mn); and 1.5 mass % or more and 5.0 mass % or less of molybdenum (Mo); a total content of impurities being phosphor (P) and sulfur (S) is 0.03 mass % or more; and the remaining is iron (Fe). Furthermore, the carbon concentration satisfies the following Formula (1): $0.75 \leq X < 1$ ... Formula (1) wherein, in Formula (1), X represents surface carbon concentration/inner carbon concentration. Therefore, the bolt of the present invention has low quench cracking susceptibility and excellent delayed fracture resistance, because an increase in temperature at which martensite transformation occurs (Ms point) on the surface side is held down.

9 Claims, No Drawings

BOLT

TECHNICAL FIELD

The present invention relates to a bolt, and more specifically, relates to a high-strength bolt having low quench cracking susceptibility and excellent delayed fracture resistance, and a high-strength bolt.

BACKGROUND ART

There are demands to improve the strength of bolts, from the demands for reducing weight, downsizing, and achieving high performance in automobiles.

High-strength bolts are generally increased in strength by quenching and tempering, and has a tempered martensite structure.

Generally, a high-carbon steel bolt having the tempered martensite structure and having a tensile strength exceeding 1200 MPa is remarkable in the occurrence of the so-called "delayed fracture", which bolt leads to fracture during use.

The delayed fracture is a phenomenon in which under static stress, the object suddenly fractures in a brittle manner after elapse of a certain amount of time, is one type of environmental brittleness caused by interaction of material, environment and stress, and is considered to be material degradation caused by hydrogen.

Patent Document 1 discloses a high-strength bolt that inhibits the delayed fracture by using high-carbon steel of a predetermined composition.

CITATION LIST

Patent Document

Patent Document 1: WO 2016/031528A

SUMMARY OF INVENTION

Technical Problem

However, the high-strength bolt using high-carbon steel easily generates quench cracking caused by heat treatment. Although defective items are removed by magnetic particle testing, if the crack is minute, there is a possibility that defective items may pass through the magnetic particle testing.

The present invention has been made in view of such problem in the prior art, and an object thereof is to provide a high-strength bolt having low quench cracking susceptibility and excellent delayed fracture resistance.

Solution to Problem

As a result of diligent study to achieve the above object, the inventor of the present invention found out that decarburization easily occurs with high-carbon steel at the time of quenching, and that the quench cracking is caused by martensite transformation occurring from its surface side.

Furthermore, the inventor found out that the above object can be achieved by minimizing a temperature difference at which the martensite transformation occurs (Ms point) between the surface and the inner part. The present invention has thus been completed.

Namely, a bolt of the present invention is a high-strength bolt of high-carbon steel having a tempered martensite structure, wherein the composition of the bolt comprises:

0.50 mass % or more and 0.65 mass % or less of carbon (C);

1.5 mass % or more and 2.5 mass % or less of silicon (Si);

1.0 mass % or more and 2.0 mass % or less of chromium (Cr);

0.2 mass % or more and 1.0 mass % or less of manganese (Mn); and 1.5 mass % or more and 5.0 mass % or less of molybdenum (Mo);

a total content of impurities being phosphor (P) and sulfur (S) is 0.03 mass % or more;

and the remaining is iron (Fe).

Furthermore, carbon concentration thereof satisfies the following Formula (1):

$$0.75 \leq X < 1 \qquad \text{Formula (1)}$$

wherein, in Formula (1), X represents surface carbon concentration/inner carbon concentration, and the surface carbon concentration is carbon concentration (mass %) at a position 0.025 mm deep from an uppermost surface of a bolt shank portion, and the inner carbon concentration is carbon concentration (mass %) at a position on a center line of the bolt shank portion.

Moreover, a manufacturing method of a bolt of the present invention includes:

a quenching step for quenching a bolt, the bolt having a composition in which 0.50 mass % or more and 0.65 mass % or less of carbon (C);

1.5 mass % or more and 2.5 mass % or less of silicon (Si);

1.0 mass % or more and 2.0 mass % or less of chromium (Cr);

0.2 mass % or more and 1.0 mass % or less of manganese (Mn); and 1.5 mass % or more and 5.0 mass % or less of molybdenum (Mo); are contained;

a total content of impurities being phosphor (P) and sulfur (S) is 0.03 mass % or less; and the remaining is iron (Fe).

Furthermore, a manufacturing method of a bolt wherein the quenching step satisfies the following Formulae (3) and (4):

$$CP > 0.45 \qquad \text{Formula (3)}$$

$$\text{Bolt carbon concentration} \times 0.75 \leq CP < \text{Bolt carbon concentration} \times 1 \qquad \text{Formula (4)}$$

wherein, in Formula (3) and Formula (4), CP represents a carbon potential (mass %) in an atmosphere at the time of quenching, and the bolt carbon concentration is a carbon concentration (mass %) at a position on a center line of a shank portion of the bolt prior to the quenching.

Advantageous Effects of Invention

According to the present invention, by reducing the gradient of the carbon concentration between the surface and the inner part, an increase in temperature at which martensite transformation occurs (Ms point) on the surface side is held down. Accordingly, it is possible to provide a high-strength bolt having low quench cracking susceptibility and excellent delayed fracture resistance.

DESCRIPTION OF EMBODIMENTS

The bolt of the present invention will be described in detail.

The bolt is a high-strength bolt of high-carbon steel having a tempered martensite structure, and the composition of the bolt comprises: 0.50 mass % or more and 0.65 mass % or less of carbon (C); 1.5 mass % or more and 2.5 mass % or less of silicon (Si); 1.0 mass % or more and 2.0 mass % or less of chromium (Cr); 0.2 mass % or more and 1.0 mass % or less of manganese (Mn); and 1.5 mass % or more and 5.0 mass % or less of molybdenum (Mo); a total content of impurities being phosphor (P) and sulfur (S) is 0.03 mass % or less; and the remaining is iron (Fe).

Furthermore, the carbon concentration satisfies the following Formula (1):

$$0.75 \leq X < 1 \quad \text{Formula (1)}$$

wherein, in Formula (1), X represents surface carbon concentration/inner carbon concentration, and the surface carbon concentration is carbon concentration (mass %) at a position 0.025 mm deep from an uppermost surface of a bolt shank portion, and the inner carbon concentration is carbon concentration (mass %) at a position on a center line of the bolt shank portion.

Generally, carbon steel transforms to martensite by quenching and forms a martensite structure.

The martensite structure after being subjected to the quenching is a structure showing the highest hardness among structures with the same chemical composition, and the hardness of the carbon steel being subjected to the quenching increases as the carbon concentration increases. However, the higher the carbon concentration of the carbon steel is, the lower the toughness thereof becomes, and the carbon steel becomes brittle;

therefore, tempering is required.

In the present invention, "tempered martensite structure" is a structure formed by tempering after the quenching, and is a structure in which iron carbide ($Fe_3C$) is precipitated from the quenched martensite structure, and is what is called a troostite structure or a sorbite structure.

The troostite is a mixed structure of ferrite and cementite, and is formed by tempering at about 400° C. The sorbite structure is a structure in which iron carbide ($Fe_3C$) is more coarsed and aggregated than the troostite structure, and is formed by tempering at 550° C. to 650° C. Among these, the sorbite structure is suitable since it is tough and strong against impact.

A high-carbon steel bolt satisfying the above carbon concentration is reduced in quench cracking susceptibility by having a relationship between a surface carbon concentration and an inner carbon concentration satisfying the following Formula (1). Hence, the bolt becomes a high-strength bolt with no quench cracking defect and with excellent delayed fracture resistance.

The martensite transformation due to quenching is a phase transformation accompanying shear deformation, and is a transformation in which a macro shape change occurs.

Furthermore, carbon steel with high carbon concentration easily decarburizes at the time of quenching, and the carbon concentration difference easily increases between the surface and the inner part. Moreover, the temperature at which the martensite transformation of the carbon steel occurs (Ms point) generally increases as the carbon concentration decreases.

Furthermore, a gradient of the carbon concentration generated by the decarburization causes an increase in generated strain at the time of martensite transformation, thus causing cracks.

In the present invention, since the following Formula (1) is satisfied and the gradient of the carbon concentration is small, the martensite transformation occurs evenly on the surface and in the inner part; the tension stress thus becomes small and the quench cracking susceptibility decreases, which allows for preventing the generation of cracks.

If the X in the above Formula (1) is less than 0.75, quench cracking can easily occur, and if the X in the above Formula (1) is 1 or more, the carbon concentration on the surface becomes too high due to carburization; therefore, the delayed fracture resistance decreases.

Next describes the composition of the bolt.

The carbon (C) content is 0.50 mass % or more and 0.65 mass % or less.

If the carbon content is less than 0.50 mass %, sufficient resistance to temper softening is not obtained, thus causing softening due to the tempering. As a result, tempering at a high temperature cannot be carried out, thus causing a decrease in the delayed fracture resistance.

Moreover, if the carbon content exceeds 0.65 mass %, the amount of cementite that accumulates hydrogen increases remarkably. As a result, the delayed fracture resistance will not reach an excellent level.

The silicon (Si) content is 1.5 mass % or more and 2.5 mass % or less.

If the silicon content is less than 1.5 mass %, the tensile strength decreases, and also sufficient resistance to temper softening is not obtained. As a result, the tempering at a high temperature cannot be carried out, and the delayed fracture resistance decreases. If the silicon content exceeds 2.5 mass %, forgeability thereof deteriorates remarkably. This makes it difficult to shape the bolt into a predetermined shape.

The chromium (Cr) content is 1.0 mass % or more and 2.0 mass % or less.

If the chromium content is less than 1.0 mass %, sufficient resistance to temper softening cannot be achieved, and the tempering at a high temperature cannot be carried out. As a result, the delayed fracture resistance decreases.

Moreover, if the chromium content exceeds 2.0, cold forgeability of the steel material decreases.

The manganese (Mn) content 0.2 mass % or more and 1.0 mass % or less.

Manganese is a hardenability enhancing element, and the tensile strength increases when 0.2 mass % or more is comprised.

Moreover, if the manganese content exceeds 1.0 mass %, segregation to the grain boundary becomes promoted, thus causing the grain boundary strength to decrease and the delayed fracture resistance to decrease.

The molybdenum (Mo) content is 1.5 mass % or more and 5.0 mass % or less.

If the molybdenum content is 1.5 mass % or less, the generated amount of molybdenum-based carbides that serve as a trapping site of hydrogen will not be enough. As a result, the hydrogen embrittlement cannot be inhibited and the delayed fracture resistance decreases.

Moreover, although molybdenum is an element that enhances quenching properties to obtain the martensite structure, increases softening resistance at the time of the quenching process, and is effective for achieving high strength, no extra effect can be achieved by increasing the amount contained over an amount exceeding 5.0 mass %.

The total content of phosphorous and sulfur is 0.03 mass % or less, and is more preferably 0.02 mass % or less.

The total content of phosphorous and sulfur exceeding 0.03 mass % facilitates grain boundary segregation, and the grain boundary bonding force decreases thus reducing the grain boundary strength; this thus causes the delayed fracture resistance to decrease.

Moreover, the bolt of the above composition preferably has a surface carbon concentration of 0.45 mass % or more and 0.6 mass % or less.

At the time of quenching, heat transfers from the surface to its inner part; hence, a temperature difference generates between the surface and the inner part, and the martensite transformation occurs from the surface.

When the surface carbon concentration satisfies the above range and the surface carbon concentration is slightly lower than the inner carbon concentration, it is possible to reduce the lag in timing of the martensite transformation caused by the difference in carbon concentration at the time of quenching, and reduce the quench cracking susceptibility.

If the surface carbon concentration is less than 0.45 mass %, quench cracking easily generates, and if the surface carbon concentration exceeds 0.6 mass %, diffusible hydrogen present within the bolt easily aggregates at a stress concentration zone; this thus facilitates the occurrence of delayed fracture.

Moreover, the bolt preferably satisfies the following Formula (2):

$$-20\,(HV) \leq H \leq 50\,(HV) \qquad \text{Formula (2)}$$

wherein, in Formula (2), H represents inner hardness—surface hardness, the inner hardness being a Vickers hardness at a position on a center line of the bolt shank portion, and the surface hardness being a Vickers hardness at a position 0.05 mm deep from the uppermost surface of the bolt shank portion.

When the above Formula (2) is satisfied, slack quenching is prevented, unevenness in structure between the surface and the inner part is reduced, and a standard structure is formed; this reduces the unevenness in physical properties such as the tensile strength and delayed fracture resistance.

Moreover, the bolt preferably has a surface hardness of 420 (HV) or more and 600 (HV) or less. A high-carbon steel bolt with a surface hardness within the above range has a tempered martensite structure formed therein, which improves the balance between the hardness and the toughness.

Moreover, the bolt preferably has a tensile strength of 1500 MPa or more and 1800 MPa or less. With the tensile strength within the above range, it is possible to suitably use in, for example, a lower link of a reciprocating engine having a multiple linkage.

<Manufacturing Method of Bolt>

The bolt can be manufactured by a manufacturing method of the bolt of the present invention, and the manufacturing method of the bolt includes a quenching step and a tempering step.

The quenching step is a step that improves the hardness of the bolt, and is a heat treatment of heating a metal structure of the bolt until achieving an austenite structure then rapidly cooling to achieve a martensite structure, while inhibiting decarburization, and satisfies the following Formulae (3) and (4):

$$CP > 0.45 \qquad \text{Formula (3)}$$

$$\text{Bolt carbon concentration} \times 0.75 \leq CP < \text{bolt carbon concentration} \times 1 \qquad \text{Formula (4)}$$

wherein, in Formula (3) and Formula (4), CP represents a carbon potential (mass %) in an atmosphere at the time of quenching, and the bolt carbon concentration is a carbon concentration (mass %) at a position on a center line of a shank portion of a bolt prior to the quenching.

More specifically, the carbon potential preferably exceeds 0.45 and is 0.60 or less, more preferably is 0.50 or more and 0.60 or less, and further preferably is 0.55 or more and 0.60 or less.

A bolt with high carbon concentration easily decarburizes due to heat application, and quench cracking easily occurs.

In the present invention, the quenching step satisfies the above Formulae (3) and (4). This inhibits decarburization, and martensite transformation occurs at both the surface and the inner part at substantially the same time. This thus prevents the occurrence of quench cracking and can hold down the decrease in hardness.

The carbon potential in the atmosphere at the time of quenching can be adjusted by measuring a dew point of water vapor decomposed from gas within a furnace to manage the carbon concentration in the atmosphere at the time of quenching, and feeding a gas with a high carbon concentration containing CO (carbon monoxide) according to the carbon concentration in the atmosphere at the time of quenching.

Further, by making the bolt contact the gas with the high carbon concentration, the decrease in carbon concentration on the bolt surface is held down.

When the carbon potential (CP) in the atmosphere at the time of quenching in Formula (3) is 0.45 or less, decarburization easily occurs, and the quenching temperature cannot be made high; this causes the hardness of the bolt to decrease.

If the CP in Formula (4) is less than bolt carbon concentration×0.75, the decarburization proceeds and the strength of the bolt decreases, and if exceeding the bolt carbon concentration×1, carburization occurs, which causes the toughness to decrease and become brittle.

The quenching is carried out by heating to a range from 900° C. to 980° C. and the cooling to 120° C. or lower. By quenching in the above temperature range, the martensite structure is formed and the hardness increases.

A heat treatment furnace to carry out the quenching is not particularly limited as long as the carbon potential can be adjusted to the above range, however since it is difficult to increase the carbon potential with a continuous-type heat treatment furnace, a batch-type heat treatment furnace is preferably used.

The tempering is carried out, for example, within a range of 580° C. to 625° C. By tempering in this temperature range, the grain boundary cementite structure spheroidizes and finely disperses, which improves the grain boundary strength.

EXAMPLES

Hereinafter, the present invention will be described in more detail with examples. However, the present invention is not limited to the following examples.

Cold forging and thread rolling were carried out to carbon steel for high-strength bolts having a composition as shown in Table 1 below, and thereafter heat treatment is performed under the conditions shown in Table 2 below, to achieve a high-strength bolt.

TABLE 1

|  | C (mass %) | Si (mass %) | Cr (mass %) | Mn (mass %) | Mo (mass %) | S + P (mass %) | Fe (mass %) |
|---|---|---|---|---|---|---|---|
| Ex. 1 | 0.59 | 1.80 | 1.20 | 0.30 | 1.60 | 0.010 | Rem. |
| Ex. 2 | 0.60 | 1.85 | 1.20 | 0.30 | 1.60 | 0.015 | Rem. |
| Ex. 3 | 0.58 | 1.80 | 1.20 | 0.30 | 1.60 | 0.013 | Rem. |
| Ex. 4 | 0.61 | 1.80 | 1.20 | 0.30 | 1.65 | 0.015 | Rem. |
| Ex. 5 | 0.58 | 1.80 | 1.20 | 0.30 | 1.60 | 0.013 | Rem. |
| Ex. 6 | 0.65 | 1.80 | 1.20 | 0.30 | 1.60 | 0.013 | Rem. |
| Ex. 7 | 0.70 | 2.00 | 1.20 | 0.40 | 1.70 | 0.015 | Rem. |
| C. Ex. 1 | 0.58 | 1.90 | 1.20 | 0.30 | 1.60 | 0.015 | Rem. |
| C. Ex. 2 | 0.61 | 1.80 | 1.20 | 0.30 | 1.60 | 0.013 | Rem. |
| C. Ex. 3 | 0.59 | 1.80 | 1.10 | 0.33 | 1.65 | 0.015 | Rem. |
| C. Ex. 4 | 0.59 | 1.80 | 1.10 | 0.33 | 1.65 | 0.015 | Rem. |
| C. Ex. 5 | 0.59 | 1.90 | 1.20 | 0.30 | 1.60 | 0.013 | Rem. |
| C. Ex. 6 | 0.59 | 1.90 | 1.20 | 0.30 | 1.60 | 0.013 | Rem. |

Ex.: Example;
C. Ex.: Comparative Example;
Rem.: Remaining part

TABLE 2

|  | Carbon potential in quenching atmosphere (mass %) | Quenching Temperature (° C.) | Quenching Time (min) | Tempering Temperature (° C.) | Tempering Time (min) |
|---|---|---|---|---|---|
| Ex. 1 | 0.55 | 930 | 30 | 590 | 150 |
| Ex. 2 | 0.57 | 930 | 30 | 600 | 150 |
| Ex. 3 | 0.57 | 930 | 30 | 600 | 150 |
| Ex. 4 | 0.60 | 930 | 30 | 585 | 150 |
| Ex. 5 | 0.50 | 930 | 30 | 600 | 150 |
| Ex. 6 | 0.65 | 930 | 30 | 625 | 150 |
| Ex. 7 | 0.63 | 930 | 30 | 610 | 150 |
| C. Ex. 1 | 0.70 | 930 | 30 | 580 | 150 |
| C. Ex. 2 | 0.45 | 930 | 10 | 590 | 90 |
| C. Ex. 3 | 0.35 | 890 | 30 | 590 | 150 |
| C. Ex. 4 | 0.25 | 890 | 10 | 610 | 90 |
| C. Ex. 5 | 0.35 | 890 | 10 | 520 | 90 |
| C. Ex. 6 | 0.35 | 930 | 10 | 420 | 90 |

Ex.: Example;
C. Ex.: Comparative Example

High-strength bolts of Examples 1 to 7 and Comparative Examples 1 to 6 were evaluated under the following conditions.

The evaluation results are shown in Table 3.

<Measurement of Carbon Concentration>

The shank of the bolt was cut at a plane orthogonal to a center line of the shank, the carbon concentration was measured at its cross section from the surface towards the inner direction, and obtained a surface carbon amount (mass %) and surface carbon concentration/inner carbon concentration.

<Measurement of Tensile Strength>

The tensile strength (MPa) of the bolt was measured according to JIS B1051 (2009).

<Measurement of Hardness>

The shank portion proximal to the threaded portion of the bolt was cut at a plane orthogonal to the center line of the shank, and the Vickers hardness (HV) at a position 0.05 mm deep from the surface and the Vickers hardness (HV) at a position on the center line of the shank portion were measured with a test load of 2.94N.

<Quench Cracking Test>

Bolts subjected to heat treatment were observed, to confirm whether or not quench cracking occurred.

G: No bolt with quench cracking
P: 1% or more bolts with quench cracking

<Delayed Fracture Test>

With immersion in hydrochloric acid solution for a predetermined time at room temperature serving as one cycle, observation and evaluation were made whether or not the bolts were damaged.

G: No damage even after repeating for 20 cycles.
S: Damaged within 10 cycles to 20 cycles.
P: Damaged within 10 cycles.

TABLE 3

|  | Surface carbon amount (mass %) | Surface carbon concentration/ Inner carbon concentration | Tensile strength (Mpa) | Surface hardness (HV) | Inner − Surface hardness difference (HV) | Delayed fracture test | Quench cracking test |
|---|---|---|---|---|---|---|---|
| Ex. 1 | 0.55 | 0.96 | 1648 | 488 | 4 | G | G |
| Ex. 2 | 0.55 | 0.93 | 1625 | 427 | 18 | G | G |
| Ex. 3 | 0.57 | 0.97 | 1642 | 455 | −5 | G | G |
| Ex. 4 | 0.60 | 0.97 | 1750 | 494 | −15 | G | G |
| Ex. 5 | 0.50 | 0.85 | 1646 | 436 | 15 | G | G |
| Ex. 6 | 0.64 | 0.98 | 1618 | 433 | 10 | S | G |
| Ex. 7 | 0.62 | 0.89 | 1690 | 448 | 15 | S | G |
| C. Ex. 1 | 0.67 | 1.14 | 1692 | 494 | −30 | P | G |
| C. Ex. 2 | 0.45 | 0.74 | 1649 | 427 | 25 | G | P |
| C. Ex. 3 | 0.35 | 0.59 | 1608 | 401 | 40 | G | P |
| C. Ex. 4 | 0.25 | 0.42 | 1580 | 338 | 95 | G | P |

TABLE 3-continued

| | Surface carbon amount (mass %) | Surface carbon concentration/ Inner carbon concentration | Tensile strength (Mpa) | Surface hardness (HV) | Inner − Surface hardness difference (HV) | Delayed fracture test | Quench cracking test |
|---|---|---|---|---|---|---|---|
| C. Ex. 5 | 0.35 | 0.59 | 1913 | 484 | 40 | P | P |
| C. Ex. 6 | 0.35 | 0.59 | 2056 | 518 | 45 | P | P |

Ex.: Example:
C. Ex.: Comparative Example

It can be seen from Tables 1 to 3 that by heat treatment under the conditions in which the carbon potential in the atmosphere at the time of quenching satisfies Formulae (3) and (4), it is possible to manufacture a bolt that satisfies Formula (1).

Moreover, it can be seen that the bolt of the present invention that satisfies Formula (1) has a tensile strength of at least 1500 MPa, and that it is a bolt having excellent delayed fracture resistance and heat treatment fracture resistance.

The invention claimed is:

1. A bolt having a tempered martensite structure, wherein the bolt has a composition, in which:
   0.50 mass % or more and 0.65 mass % or less of carbon (C);
   1.5 mass % or more and 2.5 mass % or less of silicon (Si);
   1.0 mass % or more and 2.0 mass % or less of chromium (Cr);
   0.2 mass % or more and 1.0 mass % or less of manganese (Mn); and
   1.5 mass % or more and 5.0 mass % or less of molybdenum (Mo); are contained;
   a total content of impurities being phosphor (P) and sulfur (S) is 0.03 mass % or less; and the remaining is iron (Fe); and
   a carbon concentration of the bolt satisfies the following Formula (1):

$$0.85 \leq X < 0.97 \qquad \text{Formula (1)}$$

in which, in Formula (1), X represents a surface carbon concentration/an inner carbon concentration, and
   the surface carbon concentration is a carbon concentration (mass %) at a position 0.025 mm deep from an uppermost surface of a bolt shank portion, and the inner carbon concentration is a carbon concentration (mass %) at a position on a center line of the bolt shank portion,
   wherein the surface carbon concentration is 0.55 mass % or more and 0.64 mass % or less.

2. The bolt according to claim 1, satisfying the following Formula (2):

$$-20 \, (HV) \leq H \leq 50 \, (HV) \qquad \text{Formula (2)}$$

wherein, in Formula (2), H represents an inner hardness—a surface hardness,
   the inner hardness being a Vickers hardness at a position on a center line of the bolt shank portion, and the surface hardness being a Vickers hardness at a position 0.05 mm deep from the uppermost surface of the bolt shank portion.

3. The bolt according to claim 2, wherein the surface hardness is 420 (HV) or more and 600 (HV) or less.

4. The bolt according to claim 1, wherein a tensile strength is 1500 MPa or more and 1800 MPa or less.

5. The bolt according to claim 2, wherein a tensile strength is 1500 MPa or more and 1800 MPa or less.

6. The bolt according to claim 3, wherein a tensile strength is 1500 MPa or more and 1800 MPa or less.

7. A manufacturing method of a bolt, comprising a quenching step and a tempering step, wherein the bolt has a composition, in which:
   0.50 mass % or more and 0.65 mass % or less of carbon (C);
   1.5 mass % or more and 2.5 mass % or less of silicon (Si);
   1.0 mass % or more and 2.0 mass % or less of chromium (Cr);
   0.2 mass % or more and 1.0 mass % or less of manganese (Mn); and
   1.5 mass % or more and 5.0 mass % or less of molybdenum (Mo); are contained;
   a total content of impurities being phosphor (P) and sulfur (S) is 0.03 mass % or less; and the remaining is iron (Fe);
   a carbon concentration of the bolt satisfies the following Formula (1):

$$0.85 \leq X < 0.97 \qquad \text{Formula (1)}$$

in which, in Formula (1), X represents a surface carbon concentration/an inner carbon concentration, and
   the surface carbon concentration is a carbon concentration (mass %) at a position 0.025 mm deep from an uppermost surface of a bolt shank portion, and the inner carbon concentration is a carbon concentration (mass %) at a position on a center line of the bolt shank portion,
   wherein the surface carbon concentration is 0.55 mass % or more and 0.64 mass % or less, and
   the quenching step satisfies the following Formulae (3) and (4):

$$CP > 0.45 \qquad \text{Formula (3);}$$

$$\text{Bolt carbon concentration} \times 0.75 \leq CP < \text{bolt carbon concentration} \times 1 \qquad \text{Formula (4);}$$

in which, in Formula (3) and Formula (4), CP represents a carbon potential (mass %) in an atmosphere at a time of quenching, and the bolt carbon concentration is a carbon concentration (mass %) at a position on a center line of the shank portion of the bolt prior to the quenching.

8. The bolt according to claim 1, satisfying the following Formula (2):

$$-20 \, (HV) \leq H \leq 50 \, (HV) \qquad \text{Formula (2)}$$

wherein, in Formula (2), H represents an inner hardness—a surface hardness,
   the inner hardness being a Vickers hardness at a position on a center line of the bolt shank portion, and the surface hardness being a Vickers hardness at a position 0.05 mm deep from the uppermost surface of the bolt shank portion.

9. The bolt according to claim 1, wherein a tensile strength is 1500 MPa or more and 1800 MPa or less.

* * * * *